Figure 1:
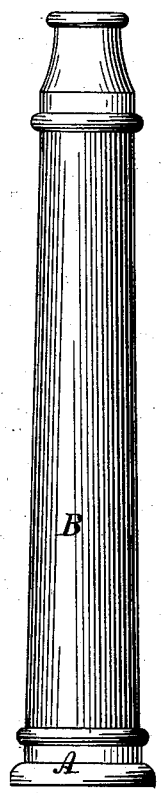

(No Model.)

F. RICHARDSON.
PROCESS OF SECURING RUBBER TO METAL.

No. 259,721. Patented June 20, 1882.

WITNESSES:

INVENTOR:
Frederick Richardson.

UNITED STATES PATENT OFFICE.

FREDERICK RICHARDSON, OF PROVIDENCE, RHODE ISLAND.

PROCESS OF SECURING RUBBER TO METAL.

SPECIFICATION forming part of Letters Patent No. 259,721, dated June 20, 1882.

Application filed December 22, 1881. (No model.)

*To all whom it may concern:*

Be it known that I, FREDERICK RICHARDSON, of the city and county of Providence, and State of Rhode Island, have invented a new and useful Improvement in the Process for Securing Rubber to Metal; and I hereby declare that the following is a full, clear, and exact description of the same, reference being had to the accompanying drawings, forming part of this specification.

The object of this invention is to unite india-rubber to metal of any kind or form.

The invention consists in the various steps of the process, more fully set forth hereinafter, and pointed out in the claim.

Various cements have heretofore been used to unite rubber to metal, but in all of them the union of the rubber with the metal is always imperfect, and after a short time of use the rubber will separate from the metal. By my improved process rubber is firmly secured to any kind or form of metal, so that sheet metal may be covered with rubber. Trays, sinks, or other dished articles may be covered with rubber; and to illustrate one of its uses, hose-nozzles may be covered with rubber, so that a fireman can secure a firmer hold on the same than when covered with leather, as the rubber will yield to the pressure of the hands. In the drawings such a rubber-covered hose-nozzle is shown.

Figure 2:
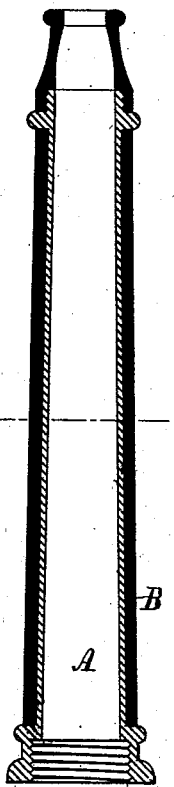
Figure 3:
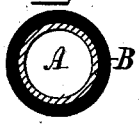

Figure 1 is a view, Fig. 2 a longitudinal section, and Fig. 3 a cross-section, of a hose-nozzle covered with rubber.

A represents the metal nozzle, and B the rubber covering.

Referring now to my improved process, I will describe the various steps more fully.

Any metal article that is to be covered in part or whole with rubber I prepare as follows: The portion to be covered with rubber I first free from all oxidation, scale, or other impurities in any manner best adapted to accomplish the object of presenting a clean metallic surface, and for most cases I prefer to subject the surface to the process of pickling in an acid bath, usually composed of diluted sulphuric acid. After the surface has been sufficiently acted upon by the acid it is cleaned by washing, and dried as quickly as possible, to prevent oxidation. I now cover this surface with one or more coats of rubber cement—that is to say, liquid rubber—which usually consists of rubber dissolved in naphtha, but any liquid rubber cement will answer. This rubber cement will adhere to the metal and protect the same. I now take a thin sheet of soft unvulcanized rubber and secure the same to the cemented surface by pressure and heat—that is to say, a plain sheet may be covered with the thin sheet by the use of a hot roll; but dished or irregular surfaces to be covered must be subjected to pressure in heated dies. To this thin sheet of rubber I now cement the rubber proper, which may be of any form or thickness required, and when trimmed and embossed, if desired, or otherwise ornamented and finished in the plastic state, I subject the whole to the usual process of vulcanization in the oven.

The sulphur contained in the rubber will in the process of vulcanization penetrate all parts and unite the whole, forming one mass. It also unites with the metal and increases the adhesion of the rubber with the metal. Articles so covered with rubber may be subjected to heat, cold, and wet without injury. The rubber will firmly adhere to the metal, and is not liable to peel off.

Having thus described my invention, I claim as new and desire to secure by Letters Patent—

The improved process substantially as herein set forth, the same consisting in preparing the metal surface by removing all oxidation, scale, or impurities, then covering the clean surface with liquid rubber, next securing a thin sheet of soft rubber by pressure and heat, then cementing the rubber to this thin sheet and subjecting the whole to vulcanization, as described.

FREDERICK RICHARDSON.

Witnesses:
HENRY J. MILLER,
J. A. MILLER, Jr.